US012805422B2

(12) United States Patent
Ramp et al.

(10) Patent No.: US 12,805,422 B2
(45) Date of Patent: Nov. 24, 2026

(54) SYSTEMS AND METHODS FOR REMOTE OPERATION OF AGRICULTURAL MACHINES

(71) Applicant: DEERE & COMPANY, Moline, IL (US)

(72) Inventors: Benjamin E. Ramp, Geneseo, IL (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 259 days.

(21) Appl. No.: 18/341,363

(22) Filed: Jun. 26, 2023

(65) Prior Publication Data

US 2024/0423112 A1 Dec. 26, 2024

(51) Int. Cl.

*A01B 69/00* (2006.01)
*A01B 79/00* (2006.01)
*G05D 1/00* (2006.01)

(52) U.S. Cl.

CPC .......... *A01B 79/005* (2013.01); *A01B 69/001* (2013.01); *G05D 1/0016* (2013.01)

(58) Field of Classification Search

None

See application file for complete search history.

(56) References Cited

U.S. PATENT DOCUMENTS 5,061,917 A * 10/1991 Higgs ................. B60C 23/0433 340/447
8,139,108 B2 3/2012 Stratton et al.
8,834,266 B2 9/2014 Thorner
2006/0190163 A1* 8/2006 Anderson .............. G01C 21/20 455/456.1
2008/0195261 A1* 8/2008 Breed ................. B60R 21/0132 701/2
2016/0314224 A1 10/2016 Wei et al.
2019/0150357 A1* 5/2019 Wu ........................ H04N 23/51
2019/0364740 A1* 12/2019 Liefooghe ............. A01F 15/042
2020/0322703 A1* 10/2020 Bures ...................... G06F 16/27

(Continued)

FOREIGN PATENT DOCUMENTS

BE 1026250 A1 * 11/2019 ............. A01F 29/09
CA 1308443 C * 10/1992

(Continued)

*Primary Examiner* — Shelley Chen

(74) *Attorney, Agent, or Firm* — Taft Stettinius & Hollister LLP; Stephen F. Rost

(57) ABSTRACT

A remote operation system for operation of an agriculture machine that provides an operator at a remote station with an operating environment that can emulate aspects of being within the agricultural machine. The remote operation system can utilize a variety of information obtained by a plurality of sensors at least during the operation of the agricultural machine. The plurality of sensors can include one or more agricultural sensors, functional sensors, and condition sensors. A controller can include a priority signal that can prioritize certain information in connection with generating the remote operation environment. Additionally, the remote operation system can amplify the output of at least certain information at the remote operation environment. The remote operation system can also accommodate the remote operator being able to monitor, and, if necessary, adjust the operation of a plurality of agricultural machines that may be simultaneously operating.

20 Claims, 5 Drawing Sheets

(56) References Cited

U.S. PATENT DOCUMENTS

| | | | | | |
|---|---|---|---|---|---|
| 2021/0357664 | A1 * | 11/2021 | Kocer | .................. | A01B 69/008 |
| 2023/0281527 | A1 * | 9/2023 | Cella | ...................... | G06V 20/17 |
| | | | | | 705/7.17 |

FOREIGN PATENT DOCUMENTS

| | | | | | |
|---|---|---|---|---|---|
| CN | 207820599 | U | * | 9/2018 | |
| DE | 112019001605 | T5 | | 12/2020 | |
| ID | P202305278 | A | * | 7/2023 | |
| JP | H05338452 | A | * | 12/1993 | |
| JP | H10217797 | A | * | 8/1998 | |
| JP | 3767245 | B2 | * | 4/2006 | |
| JP | 2024127769 | A | * | 9/2024 | |
| RU | 2769440 | C1 | * | 3/2022 | ............. G01C 21/10 |
| WO | WO-2022061447 | A1 | * | 3/2022 | ........... A01D 41/272 |

* cited by examiner

SYSTEMS AND METHODS FOR REMOTE OPERATION OF AGRICULTURAL MACHINES

FIELD OF THE DISCLOSURE

The present disclosure generally relates to automated agricultural machines, and, more specifically, to remote operation of unmanned agricultural machines.

BACKGROUND

Agricultural machines can include agricultural and construction vehicles and equipment, as well as combinations thereof, that are used to perform different agricultural and industrial tasks. For example, one or more agricultural machines, including, but not limited to harvesters and windrowers, can be utilized to plant crops, harvest crops, bale or otherwise collect crops, and spray or distribute crop inputs, such as, for example, fertilizer or chemicals, over a field or plants within a field.

There is continued interest in developing and utilizing automated or semi-automated agricultural machines, including, but not limited to, unmanned agricultural machines. As a consequence, in at least some situations, agricultural machines are, or are being, designed for an operator to not be present in the agricultural machine, let alone be both present in the agricultural machine and control operation at least certain aspects of the agricultural machine or an agricultural operation being performed by the agricultural machine. Alternatively, other agricultural machines can be designed to provide the option of either having, or not having, an operator present in the agricultural machine while at least certain aspects of the operation of the agricultural machine, or performance of an associated agricultural operation, occur in an autonomous or semi-autonomous manner.

Use of autonomous or semi-autonomous agricultural machines can at least assist with issues regarding labor shortages, the scheduling or availability of experienced operators, and potential physical limitations of certain operators. However, as a consequence, in at least certain instances, such agricultural machines can lack certain benefits and insight that an experienced operator can provide. Yet, when an operator is present in an agricultural machine, that operator is typically dedicated, or limited to, operation of that particular agricultural machine.

SUMMARY

The present disclosure may comprise one or more of the following features and combinations thereof.

In one embodiment of the present disclosure, a method is provided for remote operation of an agricultural machine. The method can include receiving information from each of a plurality of sensors of the agricultural machine, the plurality of sensors comprising at least an agricultural sensor and a functional sensor. Additionally, determinations can be made as to whether information from at least one sensor of the plurality of sensors has been designated for priority over information from at least another sensor of the plurality of sensors, and whether information from any of the plurality of sensors is assigned an amplified output. The method can also include generating, at a remote system that is separate from the agricultural machine, a remote operation environment, the remote operation environment comprising an output of information from at least one of the plurality of sensors by at least one output device of a plurality of output devices, the plurality of output devices comprising a display, and a haptic feedback device.

In another embodiment, a system is provided for remote operation of an agricultural machine. The system can include a plurality of sensors that can be positioned at the agricultural machine. Each of the plurality of sensors can be configured to provide information at least during an operation of the agricultural machine. Further, the plurality of sensors can comprise at least an agricultural sensor and a functional sensor. The system can also include a remote system having a plurality of output devices comprising a display and a haptic feedback device, the remote system being separate from the agricultural machine. Further, the display can be configured to output the one or more images captured by the optical sensor. Additionally, the system can include at least one processor and a memory device coupled with the at least one processor. The memory device can include instructions that when executed by the at least one processor cause the at least one processor to determine whether information from any of the plurality of sensors is assigned an amplified output. Additionally, the memory device can include instructions that when executed by the at least one processor cause the at least one processor to generate a remote operation environment at the remote system, the remote operation environment comprising an output of information from at least one sensor of the plurality of sensors by at least one output device of the plurality of output devices.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
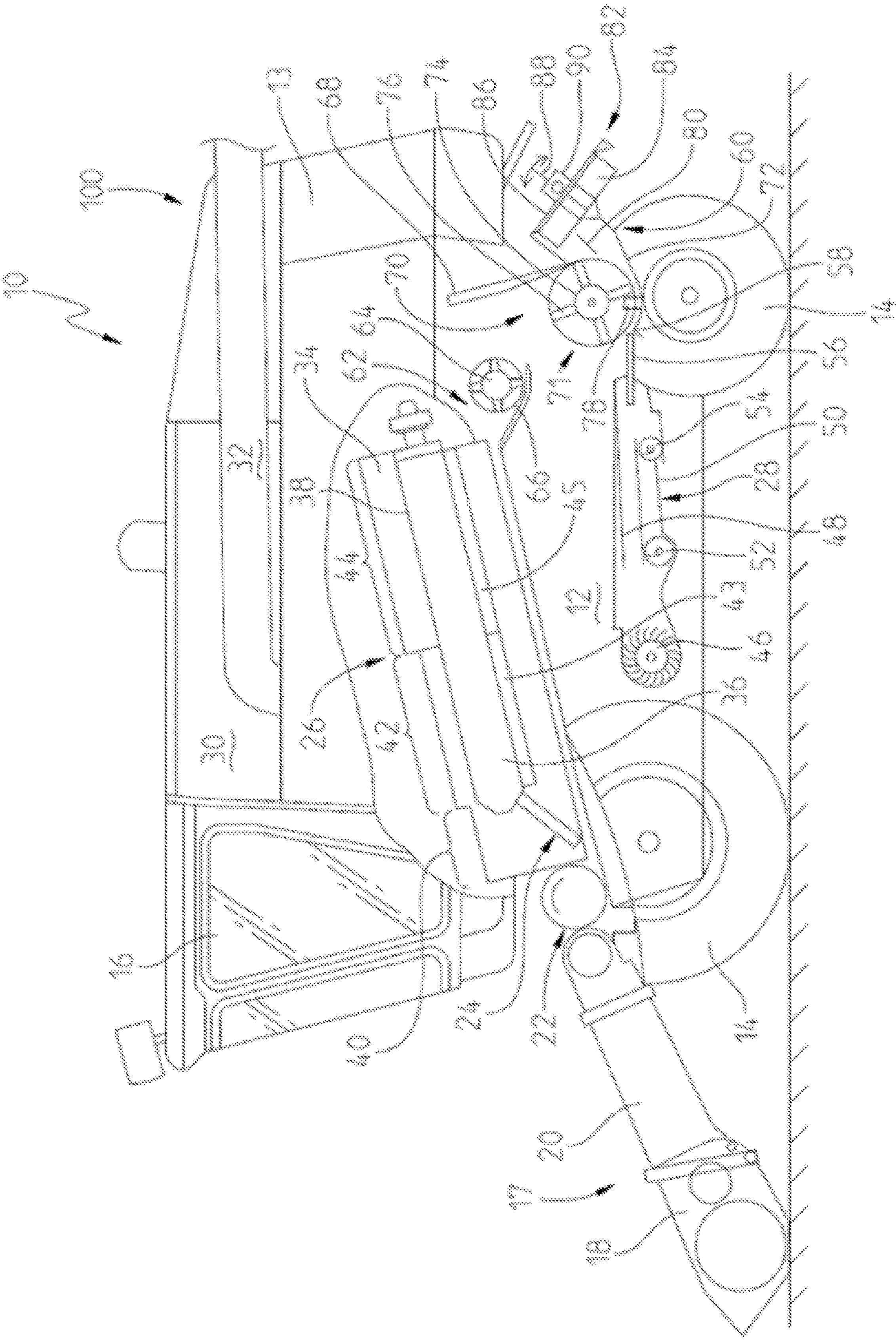
FIG. 1 illustrates a partial cutaway side view of an exemplary agricultural machine in the form of a harvester.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments of the subject application provide a remote operation system for remote operation, including control, of an agriculture machine. The remote operation system provides a remotely located operator with an operating environment and experience that can emulate aspects of being within the agricultural machine. The remote operation system can utilize a variety of information regarding the operation of the agricultural machine, including information obtained while an agricultural operation is being performed by the agricultural machine. Such information can include, but is not limited to, information obtained using one or more, if not all, of a vision system, agricultural sensors, functional sensors, condition sensors, motion sensors, vibration sensors, and sound sensors, among other information. Such information can be received by a controller or control system in connection with generating the remote operation environment. The controller or control system can include a priority signal that can prioritize certain information in connection with generating the remote operation environment. Such prioritization can be based, for example, on predetermined thresholds, as well as a priority list or settings that can be based on factory settings or set by the operator of the remote system. Additionally, the remote operation system can amplify at least certain information, or the associated output, that is to be generated in connection with the remote operation environment. The information outputted at the remote system, including via use of output devices, can comprise variety of different forms or types of information, including, but not limited to, information in the form of images, sound, text, smell, movement, or action, as well as various combinations thereof, among other forms or manners of providing or outputting information. Additionally, the remote operation system can accommodate the remote operator being able to monitor, and, if necessary, adjust the operation of a plurality of agricultural machines that may be simultaneously operating. For example, the control system can be adapted to leverage system alerts for multiple agricultural machines, as well as operational priorities, so that a single operator can selectively control multiple agricultural machines.

In FIG. 1, an embodiment of an agricultural machine 10 is shown. The agricultural machine 10 includes a frame 12 and one or more ground engaging mechanisms, such as wheels 14 or tracks, which are in contact with an underlying ground surface. In the illustrative embodiment, the wheels 14 are coupled to the frame 12 and are used for propulsion of the agricultural machine 10 in a forward operating direction (which is to the left in FIG. 1) and in other directions. In some embodiments, operation of the agricultural machine 10 is controlled from an operator cab 16. The operator cab 16 can include any number of controls for controlling the operation of the agricultural machine 10, such as a user interface. In some embodiments, operation of the agricultural machine 10 can be conducted by a human operator in the operator cab 16, a remote human operator, or an automated system. Thus, according to certain embodiments, the agricultural machine 10 can be an autonomous or semi-autonomous vehicle. Moreover, according to certain embodiments, the agricultural machine 10 can be, or be operated, as an unmanned vehicle. Thus, according to certain embodiments, the agricultural machine 10 may not include an operator cab 16.

The agricultural machine 10 can also include an agricultural system 100. For example, as mentioned above, the illustrated agricultural machine 10 is a harvester. Thus, the agricultural system 100 can comprise a plurality of components, or subsystems, relating to the agricultural machine 10 performing an agricultural operation at least in the form of harvesting crops. Thus, the agricultural systems for different types of agricultural machines 10 can be configured, including having components or subsystems, for the particular agricultural operation(s) that is/are to be performed by that agricultural machine 10. For example, the agricultural system 100 of an agricultural machine 10 in the form of a windrower can be configured to perform agricultural operations at least relating to the formation of windrows.

With respect to the exemplary agricultural machine 10 depicted in FIG. 1, the agricultural system 100 can include a header 17 having a cutting head 18 is disposed at a forward end of the agricultural machine 10 and is used to harvest crop (such as corn) and to conduct the harvested crop to a slope conveyor 20 of the header 17. The slope conveyor 20 conducts the harvested crop to a guide drum 22. The guide drum 22 of the agricultural system 100 guides the harvested crop to an inlet 24 of a threshing assembly 26, as shown in FIG. 1. The threshing assembly 26 of the agricultural system 100 includes a housing 34 and one or more threshing rotors. A single threshing rotor 36 is shown in FIG. 1, and the threshing rotor 36 includes a drum 38. The threshing assembly 26 includes a charging section 40, a threshing section 42, and a separating section 44. The charging section 40 is arranged at a front end of the threshing assembly 26, the separating section 44 is arranged at a rear end of the threshing assembly 26, and the threshing section 42 is arranged between the charging section 40 and the separating section 44.

Harvest crop that includes grain, such as corn, and material other than grain (MOG) falls through a thresher basket 43 positioned in the threshing section 42 and through a separating grate 45 positioned in the separating section 44. The harvested crop can be directed to a clean crop routing assembly 28 with a blower 46 and sieves 48, 50 with louvers. The sieves 48, 50 can be oscillated in a fore-and-aft direction. The clean crop routing assembly 28 of the agricultural system 100 removes the MOG and guides grain over a screw conveyor 52 to an elevator for grain. The elevator for grain deposits the grain in a grain tank 30 of the agricultural system 100, as shown in FIG. 1. The grain in the grain tank 30 can be unloaded by means of an unloading screw conveyor 32 to a grain wagon, trailer, or truck, for example.

Harvested crop remaining at an end of the sieve 50 is again transported to the threshing assembly 26 by a screw conveyor 54 where it is reprocessed by the threshing assembly 26. Harvested crop delivered at an end of the sieve 48 is conveyed by an oscillating sheet conveyor 56 to a lower inlet 58 of a crop debris routing assembly 60. Harvested crop at the threshing assembly 26 is processed by the separating section 44 resulting in straw being separated from other material of the harvested crop. The straw is ejected through an outlet 62 of the threshing assembly 26 and conducted to an ejection drum 64. The ejection drum 64 interacts with a sheet 66 arranged underneath the ejection drum 64 to move the straw rearwardly. A wall 68 is located to the rear of the ejection drum 64 and guides the straw into an upper inlet 70 of the crop debris routing assembly 60.

The crop debris routing assembly 60 of the agricultural system 100 includes a chopper assembly 71 having a chopper housing 72 and a chopper rotor 74 arranged in the chopper housing 72 that rotates, for example, in a counterclockwise direction about an axis that extends, for example, perpendicular to the forward operating direction. The chopper rotor 74 includes a plurality of chopper knives 76 that are distributed around a circumference of the chopper rotor 74. The chopper knives 76 interact with opposing knives 78, which are, for example, coupled to the chopper housing 72. The chopper knives 76 and the opposing knives 78 cooperate to chop the straw into smaller pieces.

The illustrated agricultural system 100 also includes one or more spreaders downstream of an outlet 80 of the crop debris routing assembly 60. One spreader 82 is shown in FIG. 1. The spreader 82 may include a number of impeller blades 84, each of which is connected to a disk 86 that rotates about a central axis 88. The impeller blades 84 extend downwardly from the disk 86 and, for example, radially outwardly from the central axis 88. The disk 86 and the impeller blades 84 coupled thereto are rotatably driven by a hydraulic motor 90. Chopped straw is moved through the outlet 80 of the crop debris routing assembly 60 to the spreader 82. Rotation of the impeller blades 84 of the spreader 82 spreads the chopped straw as it exits the agricultural machine 10.

Figure 2:
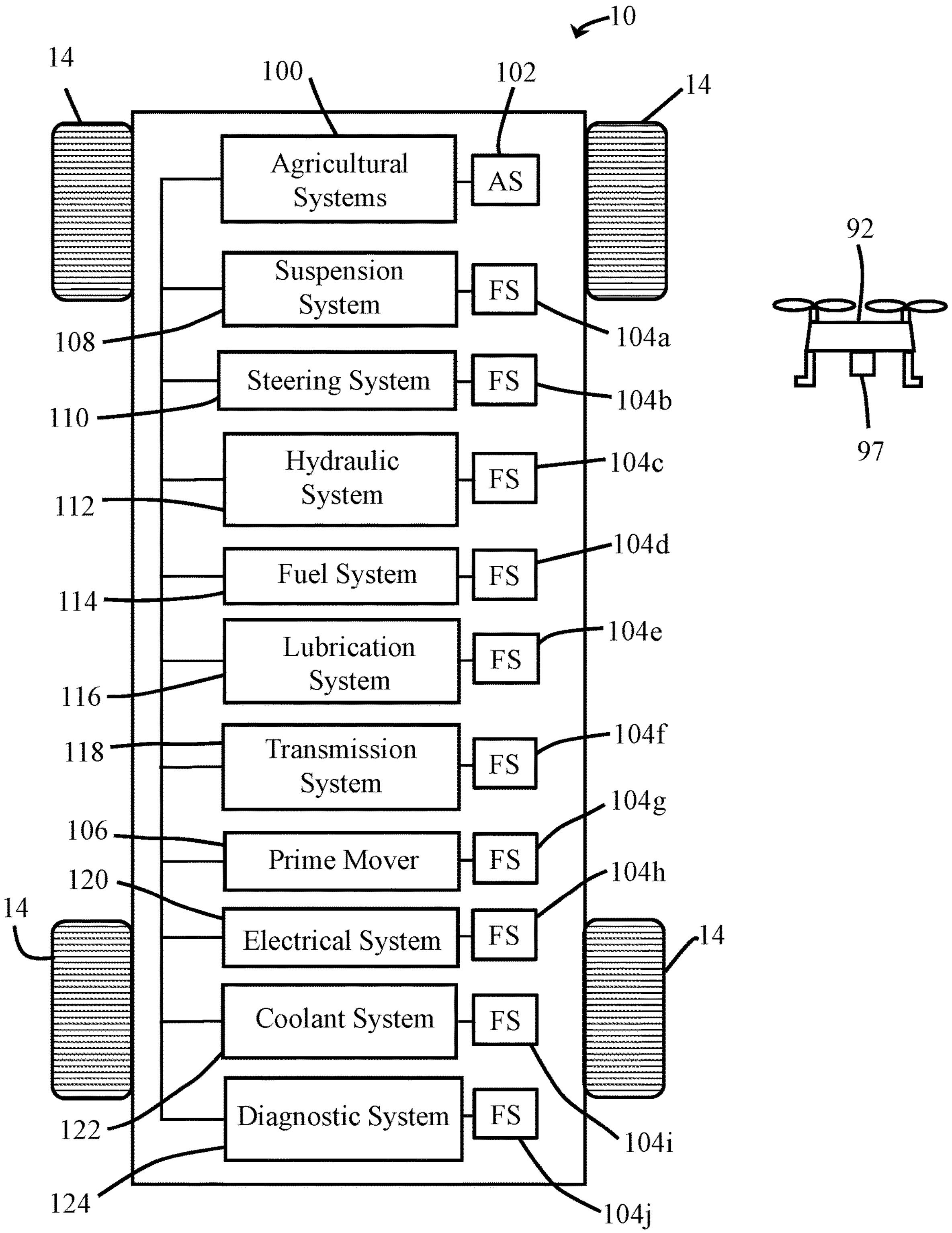
FIG. 2 illustrates a simplified block diagram representation of exemplary portions of an agricultural machine and a secondary device in the form of an unmanned aerial vehicle.

FIG. 2 illustrates a simplified block diagram representation of exemplary portions of the agricultural machine 10 and a secondary device 92 in the form of an unmanned aerial vehicle (UAV), such as, for example, a drone. As previously discussed, in the illustrated embodiment, the agricultural machine 10 includes an agricultural system 100. The agricultural system 100 can include one or more agricultural sensors 102 (generally referenced in FIG. 2 as "AS"). Moreover, the agricultural system 100 can include a plurality of agricultural sensors 102 that provide information regarding different aspects of the operation of the agricultural system 100, including, for example, information relating to the performance, status, condition, or position, as well as combinations thereof, among other information, of components or subsystems, or both, of the agricultural system 100.

For example, the agricultural sensors 102 can provide information regarding the speeds at which various drives, motors, or belts of the agricultural system 100 are operating. Such information can also include information regarding whether certain components or subsystems of the agricultural system 100 are, or are not, activated. For example, according to embodiments in which the agricultural system 100 includes an air compressor, at least one agricultural sensor 102 can provide information regarding whether the air compressor is powered on or off, as well as whether the air compressor is being, or not being, operated. The information provided by the agricultural sensors 102 can include diagnostic information, and can, in at least some instances, provide information that is compared or correlated, such as, for example, by a controller, to base or reference information.

In the illustrated embodiment in which the agricultural machine 10 is a harvester, the agricultural sensor 102 can include one or more agricultural sensors 102 related to the operation and settings of the header 17. For example, the agricultural sensor 102 can include one or more sensors that provide information regarding a draper belt speed, or, with respect to a rotary header, a speed of the associated rotor. The agricultural sensor 102 can also include one or more sensors that provide information regarding a position of the header 17, including, for example, information indicating whether the header 17 is at a raised position. The agricultural sensor 102 can also include one or more sensors that can provide information indicating a reel position, including a vertical position or a fore/aft position. The agricultural sensor 102 can also include one or more sensors that can provide information regarding a position of the deck plate(s) of the header 17. Further, the agricultural sensor 102 can include one or more sensors that provide speed information, including, for example, a speed of a backshaft and stalk roll speeds, among other information.

The agricultural sensor 102 can also include one or more sensors that provide information regarding the threshing assembly 26. For example, one or more sensors can provide information regarding either, or both, a speed of the threshing rotor 36 or a belt slip indicator for a drive for the threshing rotor 36. Further, one or more of the sensors can provide information regarding a concave clearance distance between a threshing cylinder or the drum 38 and a combine concave.

The agricultural sensor 102 can also include one or more sensors that provide information regarding the chopper assembly 71. For example, the agricultural sensor 102 can include one or more sensors that can provide information regarding a speed of the chopper rotor 74 or associated shafts. The agricultural sensor 102 can also include a belt slip indicator for a drive used with the chopper rotor 74. Additionally, one or more of the agricultural sensors 102 can provide information regarding a knife bank position, such as, for example, a position of the stationary knives 78 relative to the chopper knives 76.

The agricultural sensor 102 for the agricultural system 100 can also include one or more sensors used with the clean crop routing assembly 28, including, for example, either or both, a sensor that indicates a cleaning fan speed or a cleaning shoe shake speed. The agricultural sensor 102 can also include one or more sensors that either, or both, provide an indication of a size of a sieve opening for the sieves 48, 50. Additionally, the agricultural sensor 102 can include one or more sensors used to provide an indication of a slip of a belt used with a drive for the cleaning shoe. The agricultural sensor 102 can also include one or more sensors associated with a clean grain elevator system, including a belt slip indicator for a belt used with a drive for the elevator system.

The agricultural sensor 102 for the agricultural system 100 can also include one or more sensors used with the unloading screw conveyor 32, including in connection with providing information regarding either, or both, a position or a speed of the conveyor 32, or with respect to an unloader drive. Similarly, the agricultural system 100 can also include one or more agricultural sensors 102 used with the separating section 44, including in connection with separator covers, and with respect to a rotor for a driver for the separator, including a speed of an associated shaft or slippage of a belt used by the drive. One or more of the agricultural sensors 102 can, for example, also provide information regarding a position of a cover the grain tank 30, or be used in connection with a tailings system.

The foregoing merely provides non-limiting examples of some, but not necessarily all, of the various agricultural sensors 102 that can be provided for an agricultural machine 10 in the form of a harvester. Such example agricultural sensors 102 can be utilized in various combinations, as well as in various combinations with other agricultural sensors 102. However, as discussed above, the agricultural machine 10 can be configured to perform other, different agricultural operations. Thus, as other agricultural machines can be configured to perform different agricultural operations, such agricultural machines can have different configurations, components, and subsystems. Thus, the agricultural sensor (s) 102 used with such agricultural machines can be different than the above-provided examples that relate to a harvester.

While the foregoing has provided some examples of the agricultural sensors 102 that can be provided for the agricultural system 100, the agricultural machine 10 can also include a variety of functional sensors 104*a*, 104*b*, 104*c*, 104*d*, 104*e*, 104*f*, 104*g*, 104*h*, 104*i*, 104*j* (generally referenced as "FS" in FIG. 2). The functional sensors 104*a-j* can relate, for example, to the operation of the agricultural machine 10, including for, example, relate to at least the operation and thermal management of a prime mover 106, steering, braking, fuel usage, movement, hydraulics, and lubrication of the agricultural machine 10. Thus, while the agricultural sensors 102 can provide information with respect to the performance of an agricultural operation by, or using, the agricultural machine 10, the functional sensors 104*a-j* can generally relate to the travel or operation of the agricultural machine 10, regardless of the type of agricultural operation that is to be, or is being, performed. Thus, for example, while the particular information obtained by agricultural sensors 102 for an agricultural machine 10 in the form of a harvester can be different than the information provided by the agricultural sensors 102 of an agricultural machine 10 in the form of a windrower, the functional sensors 104*a-j* for both the harvester and the windrower can provide similar information regarding the operation of the agricultural machine 10.

Thus, for example, the agricultural machine 10 can include a suspension system 108. According to certain embodiments, the suspension system 108 can be configured to generally maintain the frame 12 of the agricultural machine 10 at a vertically centered position relative to the ground. At least certain suspension systems 108 can include a plurality of suspension cylinders and an associated hydraulic circuit(s) that can include a control valve manifold, pumps, and accumulators, among other components. The suspension system 108 can also include one or more functional sensors 104*a*, including, for example, position sensors that can at least indicate a position, or change in position, of one or more of the suspension cylinders. As discussed below, information from such functional sensors 104*a* can, among other information, be used to provide an indication to an operator at a remote system of features of the terrain or ground surface upon which the agricultural machine 10 is traveling. Moreover, information provided by such functional sensors 104*a* can, for example, be used to provide an indication to the operator at the remote system of instances in which a wheel 14 of the agricultural machine 10 has encountered a hole, or the agricultural machine 10 has otherwise experienced an abrupt change in the vertical alignment or orientation of the agricultural machine 10.

The agricultural machine 10 can also include a steering system 110. According to certain embodiments, the steering system 110 can comprise an electrical or hydraulic steering system that can control the turning of either, or both, the front or rear wheels 14 of the agricultural machine 10. Thus, the steering system 110 can include a variety of functional sensors 104*b* associated with the operation of the steering system 110, including, for example, either, or both, the associated movement and positioning of the wheels 14, or an operator controlled steering input, such as for example, a rate at which the steering wheel or joystick is being displaced to facilitate an change in an angular orientation of a wheel(s) 14, among other inputs. For example, such functional sensors 104*b* for the steering system 110 can include one or more sensors that provide information regarding wheel position and wheel slip, among other information. Additionally, such functional sensors 104*b* for the steering system 110, among other functional sensors, can include one or more sensors that provide information regarding an air pressure, or lack thereof, in each of the wheels 14.

As previously mentioned, the suspension system 108, as well as the steering system 110, can be hydraulically actuated systems. The agricultural machine 10 can further include other hydraulically actuated systems including, but not limited to, a braking system. In view of the foregoing, the agricultural machine 10 can include one or more hydraulic systems 112, including auxiliary hydraulic systems, having one or more functional sensors 104*c*. Such functional sensors 104*c* in the hydraulic system 112, or in other systems that utilized hydraulics, can provide a variety of information, including, for example, information regarding hydraulic pressure, the temperature of the hydraulic fluid, hydrostatic levels, or information regarding the amount or level of hydraulic fluid, as well as combinations thereof, among other information.

The agricultural machine 10 can also include a fuel system 114 that can contain a fuel used for the operation of the prime mover 106. The fuel system 114 can include one or more tanks that can contain a collection of the fuel, as well as associated pumps and fuel injectors. The fuel system 114 can also have a variety of functional sensors 104*d*, including, for example, one or more sensors that can provide information regarding either, or both, a level or quantity of fuel in the fuel system 114, including in the tank(s), or a temperature of the fuel, among other information.

Similarly, the agricultural machine 10 can also include a lubrication system 116 having, for example, a pump, reservoir, and supply and return lines. One or more functional sensors 104*e* can be utilized to provide a variety of information regarding the lubrication system 116, including information regarding the associated lubricant, such as, for example, oil. According to certain embodiments such functional sensors 104*e* can include one or more sensors that provide information regarding either, or both, oil pressure or oil levels, among other information.

The agricultural machine 10 can also include a transmission system 118 having a transmission, as well as a fluid circuit that circulates transmission fluid to the transmission. Accordingly, the agricultural machine 10 can include functional sensors 104*f* for the transmission system 118 that can provide information regarding transmission fluid levels, as well as an indication of which particular gear of the transmission, if any, is currently engaged.

The prime mover 106, such as, for example, an engine or motor, is configured to generate power, such as, for example, via use of fuel from the fuel system 114, that can be used for the propulsion of the agricultural machine 10. A variety of functional sensors 104*g* can be used to sense, or otherwise monitor, information pertaining to the operation of the prime mover 106. For example, one or more sensors functional sensors 104*g* can provide information regarding an engine speed, engine fan speed, charge air temperature, ambient air temperature, information regarding an associated air filter/inlet air restriction, or information regarding the associated travel speed of the agricultural machine 10, as well as combinations thereof, among other information relating to the operation of the prime mover 106. At least certain types of prime movers 106, including those that are utilized, at least in part, with internal combustion engines, can also include an exhaust system. Thus, the functional sensors 104*g* associated with the prime mover 106 can also include one or more sensors that can detect characteristics regarding the associated exhaust or associated components or additives of/for the exhaust system, including, for example, diesel exhaust fluid levels, among other information.

Additionally, the agricultural machine 10 can also include an electrical system 120 having one or more batteries that can be utilized to provide electrical power to various components of the agricultural machine 10. The electrical system 120 can include one or more functional sensors 104*h* that can provide information regarding the storage and use of electrical power. For example, according to certain embodiments, the functional sensor(s) 104*h* of the electrical system 120 can include one or more voltmeters, among other types of sensors.

The agricultural machine 10 can also include a coolant system 122 utilized to cool various aspects of the agricultural machine 10, including, for example, either, or both, the prime mover 106 or the battery(ies) of the electrical system 120, among other components of the agricultural machine 10. The coolant system 122 can therefore include, for example, one or more reservoirs or tanks that may contain thermal fluids used by the coolant system 122, as well as associated pumps and heat exchangers, among other components. Thus, functional sensors 104*i* of the coolant system 122 can include, for example, sensors that can provide information regarding the temperatures of the thermal fluids at various locations about the associated thermal fluid circuits, as well as information regarding levels or amounts of thermal fluid in the coolant system 122.

The foregoing provides non-limiting examples of various systems and associated functional sensors 104*a-i* for the exemplary agricultural machine 10. Different agricultural machines may include various combinations of the systems 106, 108, 110, 112, 114, 115, 118, 102, 122 discussed herein, as well as other systems. Additionally, according to certain embodiments, the agricultural machine 10 can include a diagnostic system 124 that can determine various information, including, by use of information provided by the functional sensors 104*a-i* of one or more of the systems 106, 108, 110, 112, 114, 115, 118, 102, 122 of the agricultural machine 10, as well as from use of information from a plurality of functional sensors 104*j* of the diagnostic system 124. Additionally, the diagnostic system 124 can also utilize other, operator-provided information to control the operation of the various systems 106, 108, 110, 112, 114, 115, 118, 102, 122, as well as the operation of the associated agricultural system 100.

Figure 3:
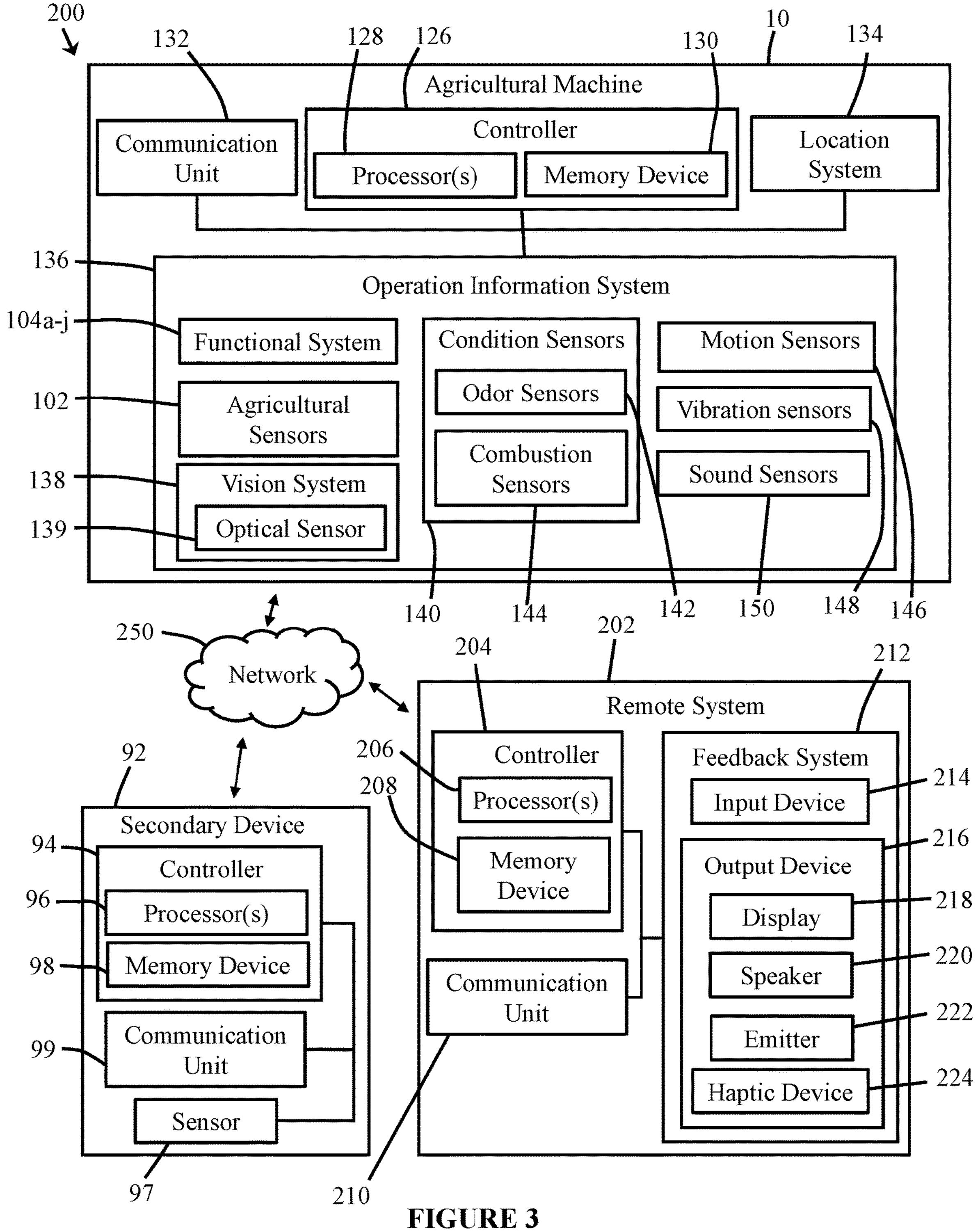
FIG. 3 illustrates a simplified block diagram of an exemplary remote operation system according to an illustrated embodiment of the subject application.

FIG. 3 illustrates a simplified block diagram of an exemplary remote operation system 200 according to an illustrated embodiment of the subject application. As shown, the remote operation system 200 can include the agricultural machine 10, a remote system 202, and, optionally, the secondary device 92. The remote system 202 can be located at a various locations outside of the agricultural machine 10, including locations that are generally relatively close or local to the agricultural machine 10. Further, the remote system 202 can be located at locations that are remote from the agricultural machine 10, including, but not limited to, being in different towns, counties, states, or countries, among other locations As discussed below, according to illustrated embodiments of the subject disclosure, information obtained by, or during, the operation of the agricultural machine 10 and, optionally, the secondary device 92, can be utilized to replicate or otherwise provide an indication to an operator at the remote system 202 of the current operating environment and conditions being experienced at the agricultural machine 10. Thus, while the operator of the remote system 202 is not located in the agricultural machine 10, the remote operation system 200 can be utilized to provide a generally live feeling to the operator at the remote system 202 as to at least certain aspects of the operation of the agricultural machine 10 occur, including while an agricultural operation is being performed. As also discussed below, at least certain aspects of the information provided to the remote system 202, or associated outputted feedback at the remote system 202, can be amplified so as to further enhance experience and environment generated at the remote system 202.

Additionally, the remote system 202 can provide the operator with an opportunity to, in response to the operating environment and experience created at the remote system 202, make adjustments in the operation or control of the agricultural machine 10. Additionally, as also discussed below, the remote operation system 200 can provide the operator of the remote system 202 an opportunity to switch to, or between, different agricultural machines, thereby allowing an operator to be involved with the operation of multiple agricultural machines that may be operating at the same time.

As shown, in FIG. 3, according to the illustrated embodiment, the agricultural machine 10, remote system 202, and secondary device 92 can each include a controller 126, 204, 94 having one or more processors 128, 206, 96 that can follow instructions, including control instructions, contained on one or more memory devices 130, 208, 98, including, for example, a non-transitory machine-readable medium. In addition to the controller 126, 204, 94 shown in FIG. 3, any of the agricultural machine 10, remote system 202, and secondary device 92 can include other, or additional, controllers, having a similar processor(s) and memory device(s).

The agricultural machine 10, remote system 202, and secondary device 92 can also each include a communication unit 132, 210, 99 that can accommodate the communication of information between each other, and moreover, with other systems, components, devices, equipment, or machinery of the remote operation system 200. The communication units 132, 210, 99 can be configured for either, or both, wired or wireless communications including, for example, via proprietary and non-proprietary wireless communication protocols. For example, the communication units 132, 210, 99 can be configured to accommodate Wi-Fi, ZigBee, Bluetooth, radio, cellular, or near-field communications, among other communications that use other communication protocols, including, but not limited to, communications over a wireless network 250. According to certain embodiments, the communication units 132, 210, 99 can each comprise a transceiver.

The agricultural machine 10 can also include a location system 134, such as, for example, a global navigation satellite system, including, but not limited to, a global positioning system (GPS). The location system 134 can be operated to provide a detailed indication of the location of the agricultural machine 10, particularly as the agricultural machine 10 traverses across a field. According to certain embodiments, the location system 134 can include a receiver that can receive information from an external source that can indicate the particular location of the agricultural machine 10, including, for example, via location coordinates.

The agricultural machine 10 can also include an operation information system 136 that can include at least be above-discussed agricultural sensors 102 and functional sensors 104*a-j*. The operation information system 136 can further include a vision system 138 that can include one or more cameras or other visual or optical sensors 139. Moreover, the vision system 138 can be configured to provide a variety of different views of the area, including, a field, upon which the agricultural machine 10 is traveling, as well as one or more views of the agricultural machine 10. The remote operation system 200 can also be configured such that images obtained by the vision system 138 can be presented at the remote system 202 in real time or near real time.

For example, according to certain embodiments, the vision system 138 can include an optical camera(s), such as, but not limited to, a panoramic camera(s), that can obtain one or more images, including still images, photographs, or video. According to certain embodiments, the optical camera (s) that can be positioned to generally provide, or replicate, a forward view or visual perspective of an operator that is positioned in the operator cab 16 of the agricultural machine 10. Accordingly, such an optical camera can provide a view of at least the crops or other areas of the field upon which the agricultural machine 10 is currently approaching. Additionally, or alternatively, such an optical camera can also be used to provide one or more images of a dashboard that may be present within the operator cab 16, including information being shown on, or otherwise provided by, one or more displays on the dashboard in the operator cab 16.

The vision system 138 can further include one or more cameras that can provide an image of an exterior portion of the agricultural machine 10. Such optical cameras can be used to provide a view, or vision, that can at least assist in detecting movement, position, or operation of portions of the agricultural system 100, as well as other equipment that can be detected by the vision system 138.

The optical cameras of the vision system 138 can be positioned at a variety of locations about the agricultural machine 10. For example, a first optical camera can be positioned to provide a generally forward view from the agricultural machine 10, including a view generally in the direction of travel of the agricultural machine 10. Additionally, one or more other second optical cameras can be positioned at a location that can expand upon, or supplement, the field of view provided by the first optical camera and at least a horizontal direction. Additionally, or alternatively, one or more of the first and second cameras can be a panoramic camera. Additionally, one or more optical cameras of the vision system 138 can be positioned to provide a rear or rearward view from the agricultural machine 10. For example, according to certain embodiments, the vision system 138 can include one or more optical cameras located at an exterior side of the agricultural machine 10, and positioned or oriented to provide images in rearward direction so as to generally mimic an image(s) that can be seen from rear side mirrors of the agricultural machine 10. Optical cameras can also be provided at a variety of other locations, including, for example, in front or behind the wheels 14, behind the header 17, or behind the agricultural machine 10, including optical cameras that can capture images of crop residue or stubble.

Additionally, the vision system 138 can include one or more optical cameras that can provide images of operations occurring within the agricultural machine 10. According to such an embodiment, information obtained by the vision system 138 can include, for example, images regarding crop material and residue within portions of the agricultural machine 10, including the grain tank.

According to certain embodiments, the vision system 138 can be at least part of one or more systems or subsystems of the agricultural machine 10. For example, according to certain body moments, the optical cameras used by the vision system 138 can also be utilized by the location system 134 or a guidance system that may be used in connection with the steering system 110. Alternatively, or additionally, the vision system 138 can utilize an optical camera that can be used in connection with a residue system that can monitor the discharge or spreading of crop residue that is discharged from the agricultural machine 10.

Additionally, according to certain embodiments, the secondary device 92 can include at least one sensor 97 in the form, for example, of an optical camera that can provide a variety of different views of the agricultural machine 10 or areas around the agricultural machine 10. However a variety of other types, or combinations of, sensors can also be utilized for the sensor 97 of the secondary device 92. Further, according to certain embodiments, information obtained by the sensor 97 of the secondary device 92 can be communicated via use of at least the communication units 99, 132 so as to be provided to at least the operation information system 136 of the agricultural machine. Alternatively, or additionally, information obtained by the sensor 97 of the secondary device 92 can be communicated via use of at least the communication units 99, 210 so as to be provided at least to the controller 204 of the remote system 202, The operation information system 136 can also include one or more condition sensors 140 that can provide information different from at least the information provided by the agricultural and functional sensors 102, 104*a-j*. Moreover, the condition sensors 140 can detect environmental conditions either, or both, inside or outside of the agricultural machine 10. For example, such condition sensors 140 can be configured to detect information that an operator in the operator cab 16 may detect or sense. According to certain embodiments, the condition sensors 140 include one or more odor sensors 142, including, but not limited to, sensors used to emulate a detection of a smell or odor that an operator who is at least positioned in the operator cab 16 may detect. Such odor sensors 142 can include, for example, electronic olfactory sensors, electronic noses (or E-noses), chemosensors, or gas chromatography, as well as combinations thereof, among others sensors. Further, the odor sensor(s) 142 can comprise one or more sensors used to detect a variety of different smells, including, for example, heat related smells, such as, but not limited to, smoke, burning, or smoldering. The odor sensor(s) 142 can also be configured to detect odors or smells associated with heat generated via mechanical friction from the operation of the agricultural machine 10, or friction relating to the processing of crop, including, but not limited to heat related to the binding of crop.

The condition sensors 140 can further include one or more combustion sensors 144. Unlike the odor sensor(s) 142, the combustion sensor(s) 144 can be configured to visually detect either a combustion event, including a fire or smoldering, thermal indications of elevated temperatures, or other conditions that can create a risk for developing a thermal event, such as, for example, a fire, burning, or smoldering. For example, according to certain embodiments, the combustion sensor(s) 144 can comprise an infrared or thermal sensor(s), among others, that can be utilized to detect elevated temperatures that can indicate the occurrence, or potential occurrence of a thermal event. Additionally, or alternatively, the combustion sensor(s) 144 can be an optical sensor that can detect certain conditions on the exterior of the agricultural machine 10, such as, for example, areas having an accumulation of crop material or residue that can increase a risk for an occurrence of a thermal event.

As also seen in FIG. 3, the operation information system 136 can further include one or more motion sensors 146, vibration sensors 148, and sound sensors 150. The motion and vibration sensors 146, 148 can be utilized in at least an attempt to replicate, or otherwise provide an indication, of the motions and vibrations an operator at the remote system 202 may feel if the operator were positioned in the operator cab 16, including seated in a seat in the operator cab 16. Thus for example, the motion sensor 146 may detect movement, including directional movement, acceleration/deceleration, tilt, or changes in elevation of the agricultural machine 10, as well as any combination thereof, among other types or forms of movement and vibration. The motion and vibration sensor(s) 146, 148 can therefore include one or more sensors positioned in a seat, floor, or steering wheel in the operator cab 16, as well as combinations thereof, among other sensor locations. As further previously discussed, the motion sensors 146 can also be utilized by the suspension system 108, among other systems, of the agricultural machine 10.

Similarly, the sound sensor(s) 150 can provide information regarding sounds that can be heard at, or around, the agricultural machine 10, including, but not limited to, sounds detected from within the operator cab 16. Thus, the sound sensor(s) 150 can include, for example, one or more microphones, among other audio detection devices. Additionally, the sound sensor(s) 150 can be positioned at a variety of locations about the agricultural machine 10, including, but not limited to, positioned in the operator cab 16. However, the sound sensor(s) 150 can also be provided at a variety of other locations within and outside of the agricultural machine 10, including, but not limited to, at or around the agricultural system 100, transmission system 118, or prime mover 106, as well as combinations thereof, among other locations.

The sound sensor(s) 150 can also be positioned to provide an indication of a direction at which sounds are detected, and moreover configured to accommodate a surround system effect at the remote system 202 that may assist the operator at the remote system 202 in determining a location at which the detected sound originated. Further, according to certain embodiments, the controller 126, 204 can be configured to provide a visual indication of the location at which a sound was detected, or otherwise determined by the controller 126, 204 to have originated. As discussed below, information provided by the sound sensor(s) can, according to certain embodiments, also be analyzed to identify the sound, or the potential source of the sound.

The remote system 202 can include a feedback system 212 that can comprise a variety of input/output devices. For example, the feedback system 212 can include one or more input devices 214, such as, for example, one or more a keyboards, keypads, touch screens, mouse, buttons, joysticks, switches, or mobile personal computing devices, such as, for example, mobile phones, smart phone, or tablets, as well as combinations thereof, among others, that is/are configured to receive information, commands, or instructions inputted from the operator of the remote system 202. Summarily, the feedback system 212 can include one or more output devices 216, including, for example, one or more displays 218, including touchscreens, speakers 220, odor emitters 222, or haptic feedback devices 224, as well as combinations thereof, among other types of output devices 216, that can communicate information in a variety of different manners to the operator. Thus, for example, the output devices 216 can be configured to provide information that the operator of the remote system 202 may see, smell, hear, feel, or otherwise sense.

As seen in FIG. 3, according to certain embodiments, the output devices 216 can include one or more odor emitters 222, such as, for example, spray or diffusion devices that can dispense or otherwise emit one or more fragrances at a location at which the operator of the remote system 202 is located. For example, the odor emitter 222 can include one or more reservoirs containing fragrances that can individually, or in combination with other fragrances, be emitted by the odor emitter 222. A variety of different types of fragrances can be utilized, including fragrances that can provide a smell that may be similar to smoke, burning, or smoldering of a variety of substances, including, but not limited to, crop material, residue, rubber, or plastic, among other items or materials. Additionally, or alternatively, the fragrances can be used to emulate the smells associated with heat generated via mechanical friction. Thus, the controller 126, 204, including the processor 128, 206, of the agricultural machine 10 or remote system 202 can be adapted to analyze information detected by the odor sensor(s) 142 in connection with determining which fragrance, or combination of fragrances, is/are to be emitted by the odor emitter 222. Additionally, according to certain embodiments, the odor emitter 222 can be operated in connection with information obtained from at least the combustion sensor(s) 144. For example, information obtained from the combustion sensor(s) 144 can also be utilized by the controller 126, 204 of the agricultural machine 10 or remote system 202 in connection with determining a fragrance(s) that is to be emitted from the odor emitted. Similar to use of information provided by the odor sensor(s) 142, different fragrances, different fragrances, or combinations of fragrances, can also be used to relay to the operator different information that is/was obtained by the combustion sensor(s) 144. In addition to, or in lieu of, inclusion of an odor emitter 222, according to certain embodiments, information regarding a detected odor can be communicated to an operator in the form of an audial or visual information. For example, information providing an indication of the type of odor(s) detected, a location(s) at which the odor(s) is/are detected, or a description of characteristics of the odor detected, including a description or identification of the detected smell(s), fragrances(s), or combinations of smells detected, as well combinations thereof, can be communicated to an operator via at least the display 218, speaker 220, or haptic device 224, among other forms of information.

According to certain embodiments, the haptic feedback device 224 can generate a movement(s), vibration(s), or force(s) of either, or both, a chair in which the operator is seated or of an input device(s) 214, such as, for example, a steering wheel or joystick, that is held by the operator. For example, information provided by either, or both, the motion and vibration sensors 146, 148 can be communicated, such as, for example, as a signal generated by the controller 126 at the agricultural machine 10 and communicated via the communication units 132, 210 to the controller 204 of the remote system 202. Using at least the information obtained via at least the vibration sensor(s) 148, the controller 204, including the processor 206, at the remote system 202 can generate a signal to cause the haptic feedback device 224 to vibrate an input device 214, a chair in which the operator is seated, or a floor on which the operator is standing. Similarly, information obtained by the motion sensor 146 can be used by the controller 204, including the processor 206, of the remote system 202, to cause the haptic feedback device 224, which can include one or more electric actuators, to change a position, orientation, or incline of the chair in which the operator is seated, including, for example, cause the chair to tilt in one or more directions.

Figure 4A:
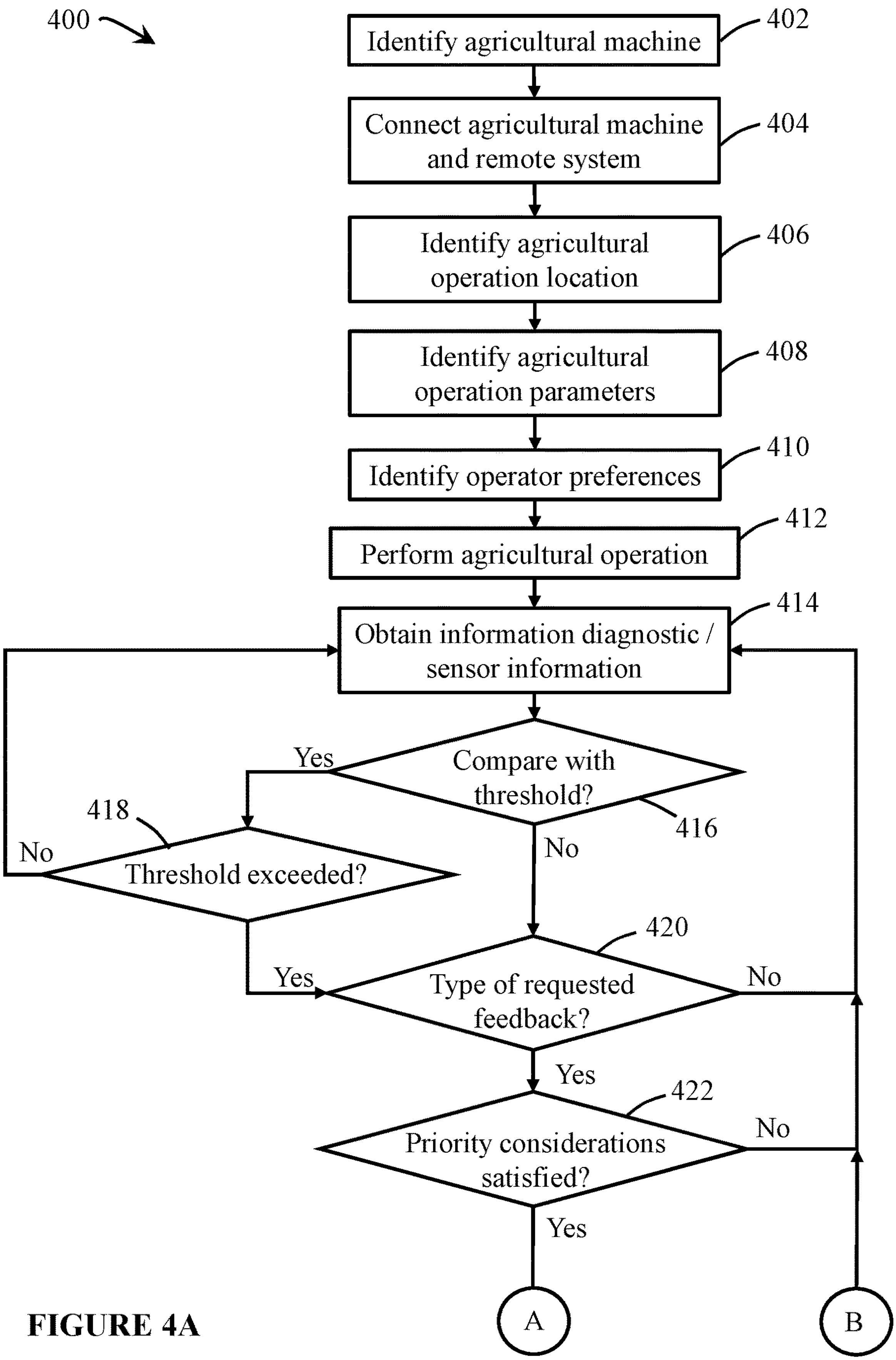
FIGS. 4A and 4B illustrate a simplified flow diagram of an exemplary method for operating the illustrated remote operation system.
Figure 4B:
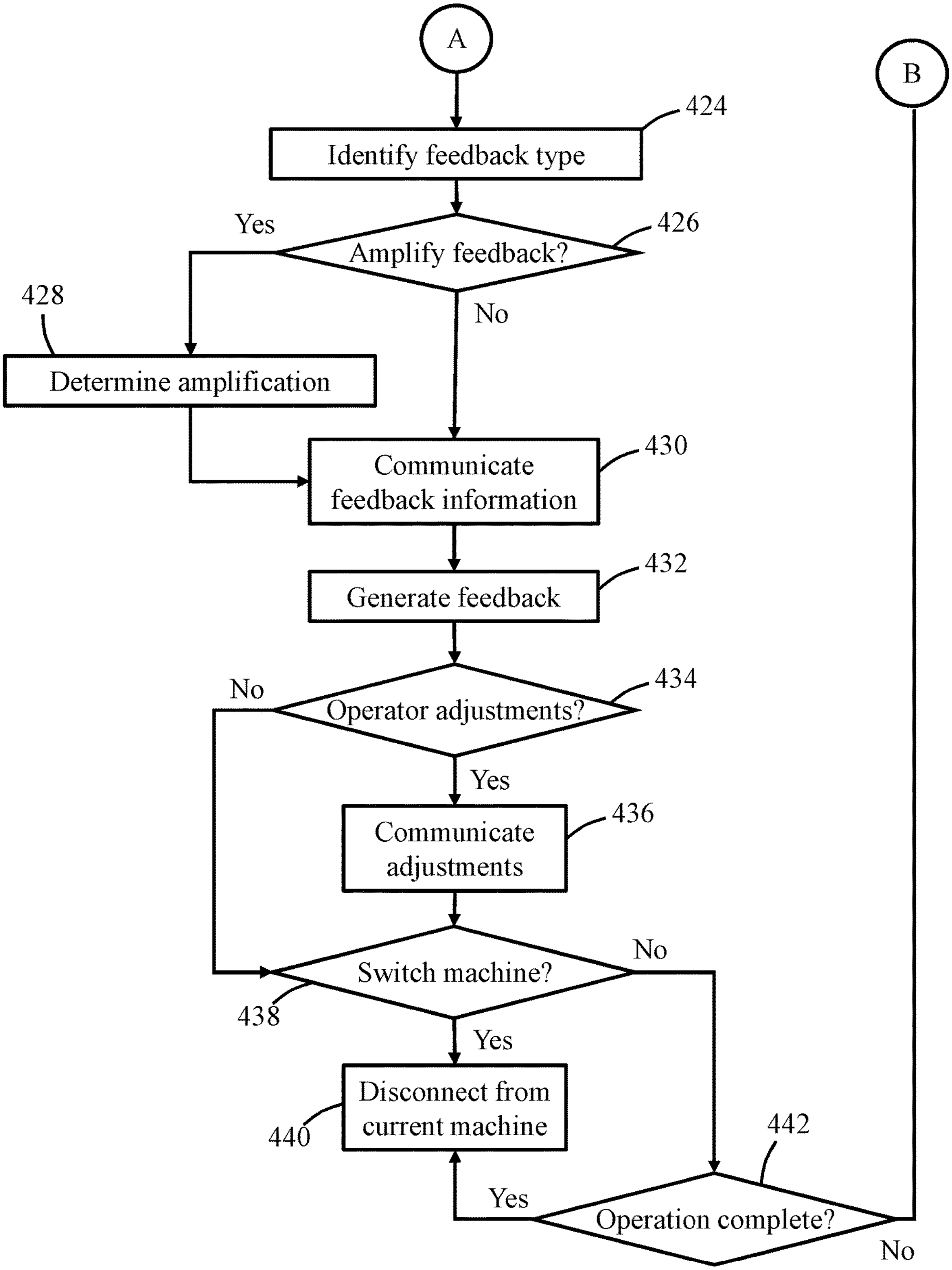

FIGS. 4A and 4B illustrate a simplified flow diagram of an exemplary method 400 for operating the illustrated remote operation system 200. The method 400 is described below in the context of being carried out by the illustrated exemplary remote operation system 200. However, it should be appreciated that method 400 can likewise be carried out by any of the other described implementations, as well as variations thereof. Further, the method 400 corresponds to, or is otherwise associated with, performance of the blocks described below in the illustrative sequence of FIGS. 4A and 4B. It should be appreciated, however, that the method 400 can be performed in one or more sequences different from the illustrative sequence. Additionally, one or more of the blocks mentioned below may not be performed, and the method 400 can include steps or processes other than those discussed below.

At block 402, the remote operation system 200 can be activated. Such activation can include activation of the agricultural machine 10 as well as the remote system 202. Moreover, at block 402, the operator of the remote system 202 can utilize the input device(s) 214 to enter or select information to identify a particular agricultural machine 10 for which the operator is to either, or both, control or receive information during the operation of the agricultural machine 10. The identification information provided by the operator at the remote system 202 can be utilized by at least the controller 126, 204 of either, or both, the agricultural machine 10 and the remote system 202 to establish a communicative connection at block 404 between the remote system 202 and the agricultural machine 10. Moreover, such an identification at block 402 can be used such that the communication unit 210 of the remote system 202 can be in communication with the communication unit 132 of the agricultural machine 10, such as, for example, via use of the network 250.

At block 406, the operator at the remote system 202 can further input, via use of the input device(s) 214, information regarding the agricultural operation that is to be performed by the agricultural machine 10. For example, at block 406, the operator can provide information regarding the location, including, the field or particular location within the field, at which an agricultural operation is to be performed by use of the agricultural machine 10. According to certain embodiments, the information provided at block 406 can be used by at least a guidance system, as thus the steering system 110, of the agricultural machine 10 such that the agricultural machine 10 can travel generally autonomously to the identified location. Thus, the location information inputted by the operator at block 406 can result in the controller 204 of the remote system 202 generating a signal that is to be communicated via the communication unit 132, 210 to the controller 126 of the agricultural machine 10 so that the agricultural machine 10 receives the location information.

The operator at the remote system 202 can further use the input device(s) 214 to input, at block 408, agricultural operation parameters that relate to the agricultural operation that is to be performed by the agricultural machine 10. The agricultural operation preferences can be stored at a variety of different locations, including, for example, the memory devices 130, 208 of the controller 126, 204 of either, or both, the agricultural machine 10 and the remote system 202.

The type of operational parameters provided at block 408 can depend on the type of agricultural machine 10, including the associated type of agricultural system 100, being utilized. Moreover, the operational parameters can relate to the type of agricultural operation that is to be performed by the agricultural machine 10 and associated agricultural system 100. For example, according embodiments, the operational parameters can relate to harvest parameters, which can include, for example, an identification of the type of crop that is being harvested, or provide an indication of the location or shape of a windrow that is to be formed by the agricultural machine 10, among other operational parameters.

At block 410, the operator at the remote system 202 can input, via use of the input device(s) 214, operator preferences. The operator preferences can pertain to the information obtained or derived by the operation information system 136 that is, or is not, to be communicated to the operator at the remote system 202. Additionally, according to certain embodiments, to the extent not modified by the operator of the remote system 202, the remote operation system 200 can also include default operator preferences, including, for example, operator preference settings that correspond to factory established settings. The operator preferences can be stored at a variety of different locations, including, for example, the memory devices 130, 208 of the controller 126, 204 of either, or both, the agricultural machine 10 or the remote system 202.

For example, according to certain embodiments, such operator preferences can relate to filtering the sounds detected by the sound sensor(s) 150 that are, or are not, to be emitted from the speaker(s) 220 at the remote system 202. In such a situation, the operator may, for example, set at block 410 an operator preference that prevents sounds that are associated, or anticipated to occur, with generally normal operation of the agricultural machine 10, including operation of the associated agricultural system 100, from being emitted from the speaker 220 at the remote system 202. According to certain embodiments, the controller 126, 204 of either, or both, the agricultural machine 10 or remote system 202 can be configured to filter out certain noises, as identified by the operator preference or otherwise identified by default settings. For example, according to certain embodiments, the controller 126, 204 can identify sounds via an analysis of the shape, frequency(ies), or other features or characteristics of the sound waves of the sounds captured by the sound sensor(s) 150. Such an analysis can include the controller 126, 204 identifying sounds via a comparison of the features or characteristics of the captured sound waves with similar features or characteristics of known sounds. Additionally, or alternatively, machine learning can be utilized by at least one controller 126, 204 to identify, or recognized sounds captured by the sound sensor(s) 222. Such an identification of the captured sounds can be evaluated in terms of the operator preferences in determining which sounds are to be filtered or blocked from other captured sounds that are to be emitted from the speaker(s) 220 at the remote system 202.

The operator preferences can also be utilized to control the manner in which the remote system 202 receives, or outputs, information from the operation information system 136. For example, the operator preferences can be utilized to control which, if any information, is communicated to the operator via use of the haptic feedback device 224. Thus, for example, rather than receiving haptic feedback, such as, for example, in the form of a vibration or movement of a chair in which the operator is sitting or through an input device(s) 214, the operator may set, via the operator preferences, to have such information communicated visually via use of the display 218. In such an example, instead of physically experiencing any movement or forces via operation of the haptic feedback device 224, such information may instead be communicated via movement of an image or video the display 218 move, such as, for example, movement of an image on the display 218 manner that can visually emulate vibration, shaking, or a change in an angle of incline.

The operator preferences can also include the operator indicating the form or manner in which information obtained by the operation information system 136 is to be communicated to the operator. For example, in certain instances, the operator may, in addition to, or in lieu, of having vibration or motion sensed information communicated via operation of the haptic feedback device 224, may opt to have information communicated visually to the operator, such as, for example, via use of the display 218. Accordingly, in certain instances, information obtained from either, or both, the motion or vibration sensors 146, 148 can be communicated to the operator at the remote system 202 via moving, including, shaking an image that is being displayed on the display 218 in a manner that can replicate or otherwise correspond to these sensed vibrations or movement.

Additionally, the operator preferences can assign priority levels to different information, or types of information, that is provided by the operation information system 136. According to some embodiments, such priority can relate to the timing of when different information obtained by the operation information system 136 is to be communicated to the operator via use of an output device 216. Additionally, or alternatively, such prioritization can result in at least certain information at least occasionally not being communicated to the operator. For example, in certain situations in which different information is obtained by the operation information system 136, or is obtained at relatively the same time, the prioritization of the information, as set via the operation preferences, can be used to determine which information is, or is not, to be communicated to the operator by the feedback system 212, or alternatively, the sequence in which the information is to be communicated.

Additionally, the operator preferences can be used to identify which type of information is to have the corresponding output provided by the output device(s) 216 intensified, elevated or otherwise amplified. Further, the operator preferences can be utilized to assign a level or degree of amplification. According to certain embodiments, the amplification can be based on a scaling or multiplication factor that is to be applied to either, or both, the information obtained by the operation information system 136, or to the manner in which the output device(s) 216 of the feedback system 212 is/are to communicate the information to the operator. The amplification can thus be determined or applied by the controller 126, 204 of the agricultural machine 10 or the remote system 202. Such elevation or amplification of the output provided at the output device(s) 216 can be utilized to assist in notifying or otherwise drawing the operator's attention to the corresponding information provided by the operation information system 136. The amplification can occur in a variety of manners, including, but not limited to, visually, audibly, or via motion or smell, as well as combinations thereof, among other manners or amplification.

With respect to amplification of information outputted by the haptic feedback device 224, such amplification can relate to any one, as well as any combination, of the magnitude, duration, or speed of the forces generated by the haptic feedback device 224. For example, the operator preferences can be set to indicate information provided by either, or both, a motion sensor(s) 146 or vibration sensor(s) 148 positioned in or about a seat in the agricultural machine 10 is to be amplified for the operator at the remote system 202 by the haptic feedback device 224. In such a situation, the amplified force(s) can have a larger magnitude, move faster, or last longer than the haptic feedback device 224 would otherwise generate the absence of such amplification.

The amplification can however impact the output of other output devices 216 in addition to, or in lieu of, the haptic feedback device 224. For example, amplification of information provided by a particular motion or vibration sensor 146, 148 can also, or alternatively, result in a change in color of the information shown on the display 218, or an increase in the volume level for sounds outputted by the speaker 220, among other changes. For example, in instances in which a wheel 14 of the agricultural machine 10 experiences a relatively rapid change in an elevation level of a wheel 14, or a change in the angle of incline of the agricultural machine 10, information obtained by the motion sensor 146 can be used in connection with a haptic feedback device 224 at the remote system 202 moving, or changing an angular orientation of the chair. Additionally, in such a situation, a visual indication of such a situation can also be communicated to the operator at the remote system 202, such as, for example, by changing an angular orientation, or through a series of movements, of the image shown on the display 218.

With respect to amplification of information that is to be outputted by the speaker 220, such amplification can result in an increase in a volume of the sound outputted from the speaker 220. For example, according to certain embodiments, the operator preferences can identify one or more sound sensors 150 for which captured sounds, if any, are to be amplified when outputted by the speaker 220 at the remote system 202.

Additionally, or alternatively, amplification of information provided by the sound sensor(s) 150 can be based on the type of sound detected by the sound sensor(s) 150. For example, the controller 126, 204 of the agricultural machine 10 or of the remote system 202 can analyze sounds detected by the sound sensor(s) 150, including characteristics relating to wave shape, size, and frequency, among other characteristics, and compare such characteristics to other known sounds to identify the sound type. Alternatively, the controller 126, 204 can identify the sound based on analyzing the sounds detected by multiple sound sensors 150 to determine a source or location at which the sound originated.

Further, certain sounds can be identified as a result of machine learning. In such situations, the controller 126, 204 can be configured to identify, from information provided by the sound sensor(s) 150, particular sounds, and whether amplification has, or has not been, assigned for the output of those sounds through the speakers 220. For example, the operator preferences can identify that sounds emitted from the speakers 220 are to be amplified when such sounds have been identified as corresponding to crop material binding at the header 17. Thus, if the identified sound corresponds to a sound selected by the operator preferences, the volume of the corresponding sound, when emitted from the speaker 220, can be increased. Additionally, similar to the above example regarding haptic feedback devices 224, such amplification for the signal outputted by the speaker 220 can also include outputting a corresponding notification or indication, including an amplified indication, on another type of output device 216, including, for example, via the display 218, odor emitter 222, or haptic feedback device 224, as well as combinations thereof.

With respect to the amplification of information that is outputted on the display 218, such amplification can pertain to adjustments in the size, position, or color, as well as combinations thereof, to the image(s) being displayed on the display 218, among other changes. Thus, according to one non-limiting example, the operator preference may be set to amplify an output of the display 218, such as, for example, changing a background color of the displayed image to red, or moving the displayed image(s) to simulate an impression of shaking in response to the vision system 138 providing information indicating the detection of an obstacle in a path of travel of the agricultural machine 10. Additionally, as with other forms of amplification, amplification of an image(s) on the display 218 can also be accompanied by outputting a corresponding notification or indication, including an amplified indication, on another type of output device 216, including, for example, via the speaker 220, odor emitter 222, or haptic feedback device 224, as well as combinations thereof.

With respect to the amplification of information that is outputted via the odor emitter 222, such amplification can correspond to a strength, time duration, or poignancy of the fragrance(s) emitted from the odor emitter 222. Again, such amplification can also be accompanied by outputting a corresponding notification or indication, including an amplified indication, on another type of output device 216, including, for example, via the display 218, speaker 220, or haptic feedback device 224, as well as combinations thereof.

The operator preferences can further include the operator setting, or calibrating, certain thresholds for the information that is obtained by the operation information system 136. Such predetermined thresholds can be used in connection with determining which, if any, information detected by the operation information system 136 is to be communicated to the operator at the remote system 202. For example, the operator can set a predetermined decibel level to assist in the determination of which information relating to sounds detected by the sound sensor(s) 150 is, or is not, to be or communicated to the operator via the speaker 220 at the remote system 202. Similarly, for example, the operator preferences can establish predetermined temperatures for information detected by the combustion sensor(s) 144. The predetermined thresholds can also pertain to information obtained by at least some of either, or both, the functional sensors 104*a-j* or the agricultural sensors 102, including, for example, information generally indicating the occurrence of belt slippage, low fluid levels, low or high pressures, high temperatures, or other potential hazards or abnormalities in the operation of the agricultural machine 10 and associated systems, as discussed, for example, above with respect to FIG. 2.

Such operator preferences can therefore be utilized to selectively set, or calibrate, a level of sensitivity with respect to the various types of information obtained by the detection and sensor system. Moreover, such predetermined thresholds can, for example, be utilized to provide greater sensitivity with respect to some information obtained or derived by the operation information system 136, and lower sensitivity with respect to other information obtained or derived by their operation information system 136. As with other aspects of the operator preferences, the predetermined thresholds set by the operator can be stored in the memory device 130, 208 of either, or both, the agricultural machine 10 or remote system 202. Further, to the extent the operator does not provide, or adjust, a predetermined threshold, for at least some of the information obtained by the operation information system 136, the remote operation system 200 can be configured to provide default predetermined threshold.

At block 412, the agricultural machine 10 can proceed with performing an agricultural operation, which can be at least partially controlled by the operator at the remote system 202. With the agricultural machine 10 operating, at block 414 the operation information system 136 can be operated so as to obtain information from the associated sensors and systems. At block 416, a determination can be made as to whether the type of information obtained by the operation information system 136 is, or is not, to be compared to a predetermined threshold. For example, according to certain embodiments, at least certain information may be communicated to the remote system 202 without comparison to a predetermined threshold. For example, either, or both, the motion or vibration sensors 146, 148 can detect information corresponding to vibrations or motions that can be traditionally transmitted to a steering wheel or joystick of the agricultural machine 10. Such information, or the detected information, can be generally continuously communicated, via use of the communication units 132, 210, to the remote system 202 while the remote system 202 is in communication with the agricultural machine 10 such that a haptic feedback device 224 can generate forces or movements at the input device(s) 214 used by the operator at the remote system 202. Thus, as such information may be used for purposes of simulating a sensation for the operator at the remote system 202 regarding the steering of the agricultural machine 10, such information may be communicated to the remote system 202 without being compared to a predetermined threshold.

Additionally, for example, at least in certain situations, information obtained using either, or both, the functional sensors 104*a-j* or the agricultural sensors 102 can be communicated for display on the display 218 of the remote system 202 without undergoing a comparison with a predetermined threshold(s). For example, according to certain embodiments, the display 218 at the remote system 202 can be configured to provide certain information, such as, for example, fuel levels, oil pressure, voltmeter reading, or coolant temperature, as well as combinations thereof, among other information, on the display 218. In such a situation, such displayed information can be continuously, or at certain predetermined time thresholds, updated for display on the display 218. Such information can also be presented on the display 218 in a variety of formats, including, for example, arranged in a column of sensed information on the display 218. Thus, with respect to information from the operation information system 136 that is not to be compared with a predetermined threshold, the method 400 can proceed to block 420, where the type of feedback, if any, for the information is to be identified by the controller 126, 204, including, the processor 128, 206, of either, or both, the agricultural machine 10 or the remote system 202.

If, however, a determination is made at block 416 that the particular information from the operation information system 136 is to be compared with a predetermined threshold, as discussed above with respect to block 410, then such a comparison can occur at block 418. Further, such a comparison of information obtained by the operation information system 136 and the corresponding predetermined threshold can be performed by the controller 126, 204 of either, or both, of the agricultural machine 10 and the remote system 202. To the extent the controller 204 of the remote system 202 is to perform the comparison at block 418, the information obtained by the operation information system 136 for such a comparison can be communicated via the communication units 132, 210 to the remote system 202 at either block 414 or block 416, among other times.

The comparison of the information obtained by the operation information system 136 and the corresponding predetermined threshold can at least assist in the remote operation system 200 being selective in information that is communicated to the operator at the remote system 202. Moreover, with respect to the information that is determined at block 416 to be subjected to such a comparison at block 418, only the information that exceed the corresponding predetermined threshold may remain eligible to be communicated to the operator at the remote system 202 via operation of an output device(s) 216. Moreover, information determined at block 418 to be within, or otherwise satisfy, the associated predetermined threshold may not be communicated to the operator at the remote system 202. Thus, as indicated in FIG. 4A, with respect to information from the operation information system 136 that satisfies the corresponding predetermined threshold, the method 400 can return to block 414, wherein subsequent information can be obtained by the corresponding sensor.

At block 420, the controller 126, 204 of either, or both, the agricultural machine 10 or the remote system 202 can determine whether the information that has exceeded the predetermined threshold is the type of information for which feedback is to be provided to the operator via an output device(s) 216 of the remote system 202. For example, at block 420, a determination can be made as to whether the operator preferences provided at block 410, or alternatively, the default preferences, indicate whether the information that was determined at block 418 to have exceeded the associated predetermined threshold is, or is not, the type of information that is to be presented to the operator via operation of an output device(s) 216. For example, at block 410, the operator may indicate that the operator is to be notified of information from the motion sensor(s) 146 corresponding to a change in the terrain in which the agricultural machine 10 is operating, including, for example, instances in which an elevation of a wheel 14 of the agricultural machine 19 has rapidly dropped, as may be detected by a motion sensor(s) 146. In such an example, as the threshold exceeded relates to information that the operator has indicated (at block 410) a preference for receiving, as determined at block 420, the method 400 can proceed to block 422, where the associated information will be analyzed in connection with the prioritization analysis. Conversely, the operator may also indicate via the operator preferences at block 410 that the output devices 216 at the remote system 202 are not to generate any indication of a change in acceleration or deceleration of the agricultural machine 10, as may also be detected by a motion sensor(s) 146. In such an example, as information regarding acceleration/deceleration is not to be output by an output device (s) 216 of the remote system 202, as determined at block 420, the method 400 can return to block 414, wherein the operation information system 136 continues to obtain information from the associated systems and sensors.

At block 422, the controller 126, 204, including the processor 128, 206, of either, or both, the agricultural machine 10 or the remote system 202, can determine whether priority considerations are to be evaluated. For example, as previously discussed, in certain instances information from multiple sensors may, at generally the same time, be determined to exceed their corresponding predetermined thresholds. In such a situation, the controller 126, 204 can determine which, if any, of the information that has been determined to exceed the corresponding predetermined threshold is to be communicated to the operator at the remote system 202 via an output device(s) 216, before, or otherwise prioritized over, the other information that was determined to exceed a corresponding predetermined threshold.

For example, information from the combustion sensor(s) 144 indicating the presence of a fire on the agricultural machine 10 may be prioritized via the operator preferences at block 410 over information regarding a change in the terrain in which the agricultural machine 10 is traveling. In such an example, in the event the operation information system 136, including, for example, a combustion sensor 140, provides information indicating the presence of a fire or other combustion related event, the controller 126, 204 can identify such information as pertaining to prioritized information. With such a configuration or operator preference, the controller 126, 204 can be configured to provide signals indicating that, in instances in which information is obtained that indicates the presence of a fire or other combustion event, that information is to be communicated to the operator via an output device(s) 216 before other, non-prioritized information is communicated to the operator. Additionally, or alternatively, as a consequence of information relating to an indication of a presence of a fire or combustion related event being prioritized, the controller 126, 204 may determine that only the prioritized information is, at least at this time, to be communicated to the operator via operation of an output device(s) 216. According to such an embodiment, with respect to non-prioritized information, in the event there is such prioritized information that is to be communicated to the operator, rather than also communicating the non-prioritized information to the operator via an output device 216, the method 400 instead can return to block 414, wherein the operation information system 136 continues to obtain information from the associated systems and sensors for the non-prioritized information.

Priority considerations can also be determined by the controller 126, 204 at block 420 to be satisfied if any of the information being evaluated at block 420 is not prioritized over any other information. Additionally, according to certain embodiments, the information determined at block 416 to not be subjected to comparison with a predetermined threshold can also be identified at block 422 as not applicable to the prioritization analysis at block 422. Thus, for example, information regarding fuel levels may not be the type of information that is to be compared with a predetermined threshold, as discussed above with respect to block

416. Thus, such fuel level information may not be subjected to the priority consideration at block 422. In such an example, information regarding the fuel level can be communicated to the operator, such as, for example, via the display 218 regardless of whether other, prioritized information, as determined at block 422 is also to be communicated to the operator. While the foregoing example is discussed with respect to a fuel level, a similar approach is also applicable to other information provided by the operation information system 136.

At block 424, the type of feedback(s) associated with the information that is to be communicated via the output device(s) 216 of the remote system 202 can be identified. Moreover, according to the illustrated embodiment, one or more of the display 218, speaker 220, odor emitter 222, or haptic feedback device 224 can be utilized to communicate information provided by the operation information system 136. Thus, for example, information obtained by a combustion sensor(s) 144 that is determined at block 418 to exceed the corresponding predetermined threshold, can be identified at block 420 as having a feedback in the form of one or more of a visual indication provided on the display 218, emission of a fragrance by the odor emitter 222 corresponding to the type of detected elevated temperature event, a force(s) generated via the haptic feedback device 224, or an audible alert transmitted from the speaker 220, as well as any combination thereof. Alternatively, the operator preferences provided at block 410 may indicate that at least certain types of information, regardless of whether the corresponding predetermined threshold is exceeded, is not to be communicated to the operator via an output device(s) 216. Thus, in such a situation, the method 400 can return to block 414, wherein the operation information system 136 can continue to monitor and receive information.

At block 426, a determination can be made by the controller 126, 204 of either, or both, the agricultural machine 10 or the remote system 202 as to whether the feedback that is to be provided by the feedback system 212 at the remote system 202 is to be amplified. As previously discussed, such amplification determination can be based, at least in part, on the operator preferences set at block 410, or based on default settings. If the feedback is to be amplified, then at block 428 the extent, degree, or level of amplification can be identified or determined.

To the extent the feedback information has not already been communicated via the communication units 132, 210 to the remote system 202, the feedback information can be communicated to the remote system 202 at block 430. For example, according to certain embodiments, the information obtained by the operation information system 136 at block 414 can be communicated to the remote system 202 such that the controller 204 at the remote system 202 performs, for example, the features discussed above with respect to one or more of blocks 416 through 428. Alternatively, according to certain embodiments, at least a portion, if not all, of the features discussed at blocks 416 through 428, can be performed using the controller 126 of the agricultural machine 10, or a combination of the controllers 126, 204 of the agricultural machine 10 and the remote system 202.

While the feedback communicated at the remote system 202 via the output devices 216 can be in real, or near real, time, the controller 204, including the processor 206, can be configured to accommodate playback of the output provided by the output device(s) 216. Thus, for example, with respect to the feedback outputted by one or both of the display 218 and the speaker 220, the remote system 202 can be configured to accommodate the operator at the remote system 202 playing back an image(s) or sound that was previously shown or emitted from the display 218 or speaker 220, respectively. For example, the memory device 208 can at least temporarily retain a retrievable record of the feedback provided by an output device(s) 216. Such playback features thus can also apply to other output devices 216, including, for example, the haptic feedback device 224 and odor emitter 222.

According to certain embodiments, one or more specific sensors 102, 104*a-j*, if not all sensors 102, 104*a-j*, can be identified to trigger a recording of information provided or detected by the sensor 102, 104*a-j* upon the occurrence of a predetermined criteria or event. For example, one or more sensors 102, 104*a-j* can be designated to initiate a recording of information provided by that sensor 102, 104*a-j*, or other sensors 102, 104*a-j*, when a threshold measurement or value, among other criteria or parameters, is obtained or detected via use of, or from information provided by, the sensor 102, 104*a-j*. The recording event can at least temporarily record information provided by that sensor 102, 104*a-j*, or other sensors 102, 104*a-j*, that can accommodate later playback of the information by an output device(s) 216. The designated sensor(s) 102, 104*a-j* can be operator selected, assigned via default conditions, or correspond to information for which the associated output is to be prioritized, as previously discussed.

At block 432, the output device(s) 216 can be utilized to generate the feedback for the operator at the remote system 202. Thus, for example, one or more of the display 218, speaker 220, odor emitter 222, or haptic feedback device 224, as well as combinations thereof, among other types of output devices 216, can be operated via one or more signals from the controller 126, 204 such that the information detected by the operation information system 136 can create a remote operation environment and experience at the remote system 202 that may at least partially emulate the conditions being experienced at, in, or around the agricultural machine 10.

The remote operation system 200 can also accommodate the operator making adjustments to the remote operation experience at block 434. For example, upon experiencing the remote operation environment created by use of at least the output devices 216, the operator may determine that one or more predetermined thresholds that were identified at block 410, or are based on default thresholds, are to be adjusted so as to increase or decrease the sensitivity associated with such thresholds. Additionally, or alternatively, the operator may make adjustments with respect to either, or both, the prioritization of communicated information or with regard to amplification of the generated output by the output device(s) 216 for certain information. Such adjustments can be stored at the remote system 202 or agricultural machine 10, including, for example, at the associated memory devices 130, 208. Thus, to the extent at least some determinations based on operator preferences are made at the agricultural machine 10, the adjustments provided by the operator at block 434 can be communicated via the communication units 132, 210 to the agricultural machine 10 at block 436.

The remote operation system 200 is also adapted to accommodate the remote operator at least temporarily switching from operating or controlling at least some aspects of one agricultural machine 10 to operating or controlling at least some aspects of another agricultural machine 10. Thus, while utilizing the remote system 202, the operator can switch between multiple agricultural machines so as to be able to control, as well as receive information from, different agricultural machines. Additionally, the remote operation system 200 can be configured so as to leverage system alerts and operational parameters to selectively control more than one machine. For example, a situation may arise in which a second agricultural machine 10 that is different than a first agricultural machine 10 to which the remote system 202 is currently connected generates an alarm or alert. In such a situation, at block 438, the operator can receive an indication of such an alarm or alert and decide whether to disconnect the remote system 202 from the first agricultural machine 10, and instead connect the remote system 202 to the second agricultural machine 10.

If the remote system 202 is to be connected to the second agricultural machine 10, then at block 440, the remote system 202 can be disconnected from the first agricultural machine 10, and can establish a connection with the second agricultural machine 10 in a manner similar to that discussed above with respect to blocks 402 and 404. Upon being connected to the second agricultural machine 10, the operator they then receive, such as, for example via use of the communication unit 210, controller 204, and an output device 216, additional information regarding the nature of the alert. Moreover, by being connected to, and having control of, the second agricultural machine 10, the operator can may then use at least the input device 214, controller 204, and communication unit 210 to make corrective or preventative actions so as to potentially rectify the issue causing the alert at the second agricultural machine.

If, however, a determination is made at block 438 that the remote system 202 is to remain connected to the first agricultural machine 10, at block 442 a determination can be made as to whether operation of the agricultural machine 10 is completed. For example, such a determination can be based on whether the agricultural operation being performed by the agricultural machine 10 has been completed. Additionally, or alternatively, whether the operation is complete maybe based, at least in part, on the agricultural machine 10 reaching an at least temporary storage location for the agricultural machine 10. If the operation is complete, then at block 440 the remote system 202 can be disconnected from the agricultural machine 10. However, if the operation is not complete, the method 400 can return to block 414, wherein the operation information system 136 can continue to obtain information regarding the operation of the agricultural machine 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A method for remote operation of an agricultural machine, the method comprising:

receiving information from each of a plurality of sensors of the agricultural machine, the plurality of sensors comprising at least an agricultural sensor and a functional sensor;

receiving, from an input device of a remote system that is separate from the agricultural machine, operator preferences identifying a type of information from the plurality of sensors that is assigned an amplified output;

determining, based on the operator preferences, a scaling factor to be applied to at least one of the information obtained from the plurality of sensors or to a manner in which a plurality of output devices of the remote system communicate the information to an operator; and generating, at the remote system, a remote operation environment comprising an amplified output of the type of information by a first output device of the plurality of output devices, the amplified output being based on application of the scaling factor and accompanied by a corresponding notification via a second output device of the plurality of output devices that is different from the first output device, the plurality of output devices comprising a display and a haptic feedback device.

2. The method of claim 1, further comprising outputting, by one or more of the plurality of output devices, information that has been designated for priority before outputting, by one or more of the plurality of output devices, information that has not been designated for priority.

3. The method of claim 1, further comprising:

displaying, at the remote system, an output of one or more images captured by a vision system of a view of at least a portion of an area outside of the agricultural machine.

4. The method of claim 1, further comprising determining which information from the plurality of sensors is to be compared to a predetermined threshold, and wherein generating the remote operation environment includes not outputting information that is determined to not exceed the predetermined threshold.

5. The method of claim 4, further comprising adjusting, in response to information received from an input device of the remote system, the predetermined threshold.

6. The method of claim 4, further comprising determining which information from the plurality of sensors is not to be compared to the predetermined threshold, and outputting, by one or more of the plurality of output devices, a signal corresponding to information that is determined to not be compared to the predetermined threshold.

7. The method of claim 1, further comprising:

communicatively connecting the agricultural machine to the remote system;

receiving, at the remote system, a signal indicative of an alert at another agricultural machine;

disconnecting, after receipt of the alert, the agricultural machine from the remote system; and communicatively connecting, after disconnecting the remote system from the agricultural machine, the remote system to the other agricultural machine.

8. The method of claim 1, wherein the plurality of sensors further includes a condition sensor configured to detect at least one of an odor or a combustion event.

9. The method of claim 1, further comprising receiving a signal from an input device of the remote system assigning one or more of output devices of the plurality of output devices to output information from one or more of the plurality of sensors.

10. The method of claim 1, further comprising receiving a signal from an input device of the remote system designating information from one or more of the plurality of sensors as information that is not to be communicated by any of the plurality of output devices.

11. A system for remote operation of an agricultural machine, the system comprising:

a plurality of sensors positioned at the agricultural machine, each of the plurality of sensors configured to provide information at least during an operation of the agricultural machine, the plurality of sensors comprising at least an agricultural sensor and a functional sensor;

a remote system having a plurality of output devices comprising a display and a haptic feedback device, the remote system being separate from the agricultural machine;

an input device of the remote system configured to receive operator preferences identifying a type of information from the plurality of sensors that is assigned an amplified output;

at least one processor; and a memory device coupled with the at least one processor, the memory device including instructions that when executed by the at least one processor cause the at least one processor to:

determine, based on the operator preferences, a scaling factor to be applied to at least one of the information obtained from the plurality of sensors or to a manner in which the plurality of output devices communicate the information to an operator, and generate a remote operation environment at the remote system, the remote operation environment comprising an amplified output of the type of information by a first output device of the plurality of output devices, the amplified output being based on application of the scaling factor and being accompanied by a corresponding notification via a second output device that is different from the first output device.

12. The system of claim 11, wherein the memory device further includes instructions that when executed by the at least one processor cause the at least one processor to generate a signal for one or more of the plurality of output devices to output information that has been designated for priority before information that has not been designated for priority is outputted by the at least one or more of the plurality of output devices.

13. The system of claim 11, further comprising an optical sensor configured to capture one or more images of at least a portion of an area located around the agricultural machine, the display being configured to output the one or more images captured by an optical sensor.

14. The system of claim 11, wherein the memory device further includes instructions that when executed by the at least one processor cause the at least one processor to:

determine which information from the plurality of sensors is to be compared to a predetermined threshold; and generate a signal that prevents information that is determined to not exceed the predetermined threshold from being outputted by the plurality of output devices.

15. The system of claim 14, wherein the memory device further includes instructions that when executed by the at least one processor cause the at least one processor to receive an adjustment signal from an input device of the remote system indicating an instruction to adjust the predetermined threshold, and, in response to receipt of the adjustment signal, adjust the predetermined threshold.

16. The system of claim 14, wherein the memory device further includes instructions that when executed by the at least one processor cause the at least one processor to determine which information from the plurality of sensors is not to be compared to the predetermined threshold and generate a signal for one or more of the plurality of output devices to output information that is determined to not be compared to the predetermined threshold.

17. The system of claim 11, wherein the memory device further includes instructions that when executed by the at least one processor cause the at least one processor to:

generate a signal to facilitate establishing a first wireless communication connection between the agricultural machine and the remote system;

receive, at the remote system, a signal indicative of an alert from another agricultural machine;

generate, after receipt of the alert, a signal to disconnect the first wireless communication connection between the agricultural machine and the remote system; and generate a signal to facilitate establishing a second wireless communication connection between the remote system and the other agricultural machine.

18. The system of claim 11, wherein the plurality of sensors further includes a condition sensor comprising at least an odor sensor.

19. The system of claim 11, wherein the memory device further includes instructions that when executed by the at least one processor cause the at least one processor to receive a signal from an input device at the remote system that assigns one or more of the plurality of output devices to information from one or more of the plurality of sensors.

20. The system of claim 11, wherein the memory device further includes instructions that when executed by the at least one processor cause the at least one processor to receive a signal from an input device of the remote system designating information from one or more of the plurality of sensors as information that is not to be communicated at the remote system by any of the plurality of output devices.

* * * * *